(12) United States Patent
Radivojevic et al.

(10) Patent No.: US 10,466,787 B2
(45) Date of Patent: Nov. 5, 2019

(54) HAPTIC DEVICE FOR PEDESTRIAN NAVIGATION

(71) Applicant: Provenance Asset Group LLC, Essex, CT (US)

(72) Inventors: Zoran Radivojevic, Cambridge (GB); Paul Beecher, Cambridge (GB); Chris Bower, Ely (GB); Anton Fahlgren, San Francisco, CA (US)

(73) Assignee: PROVENANCE ASSET GROUP LLC, Essex, CT (US)

( * ) Notice: Subject to any disclaimer, the term of this patent is extended or adjusted under 35 U.S.C. 154(b) by 530 days.

(21) Appl. No.: 13/864,582

(22) Filed: Apr. 17, 2013

(65) Prior Publication Data

US 2014/0313021 A1 Oct. 23, 2014

(51) Int. Cl.
*G06F 3/01* (2006.01)
*G08B 6/00* (2006.01)
*G01C 21/36* (2006.01)

(52) U.S. Cl.
CPC ......... *G06F 3/016* (2013.01); *G01C 21/3652* (2013.01); *G08B 6/00* (2013.01)

(58) Field of Classification Search
CPC .............. G08B 6/00; G06F 3/016; G06F 2203/013–015; G01C 21/3652
USPC ......................... 340/407.1; 345/156
See application file for complete search history.

(56) References Cited

U.S. PATENT DOCUMENTS

| | | | |
|---|---|---|---|
| 5,841,428 A * | 11/1998 | Jaeger et al. | 345/184 |
| 5,917,298 A * | 6/1999 | Miller | 318/444 |
| 6,320,496 B1 * | 11/2001 | Sokoler et al. | 340/407.1 |
| 6,671,618 B2 * | 12/2003 | Hoisko | G01C 21/20 |
| | | | 701/466 |
| 6,947,975 B2 * | 9/2005 | Wong | H04L 69/329 |
| | | | 709/208 |
| 7,957,857 B2 * | 6/2011 | Sakurai et al. | 701/23 |
| 8,938,360 B2 * | 1/2015 | Kato | G01C 21/00 |
| | | | 701/400 |
| 9,645,646 B2 * | 5/2017 | Cowley | G06F 3/016 |
| 9,854,014 B2 * | 12/2017 | Nordstrom | H04L 65/403 |

(Continued)

FOREIGN PATENT DOCUMENTS

| | | |
|---|---|---|
| CN | 1930897 A | 3/2007 |
| CN | 1950786 A | 4/2007 |

(Continued)

OTHER PUBLICATIONS

Zoran Radivojevic et al., "An apparatus and associated methods", U.S. Appl. No. 13/587,214, filed Aug. 16, 2012, 45 pgs.

*Primary Examiner* — Patrick F Marinelli
(74) *Attorney, Agent, or Firm* — Dinsmore & Shohl LLP

(57) ABSTRACT

An apparatus comprises a first magnetic plate; a second magnetic plate oriented parallel no the first magnetic plate, magnetically coupled to the first magnetic plate, and slidable relative to the first magnetic plate; a dielectric material positioned between the first magnetic plate and the second magnetic plate; and a contact in communication with the first magnetic plate and the second magnetic plate through which a voltage is applied, the voltage generating a signal that is responsive to a task performed on a mobile device, the signal providing a haptic effect to the first magnetic plate and the second magnetic plate upon sliding of the first magnetic plate relative to the second magnetic plate.

16 Claims, 5 Drawing Sheets

(56) References Cited

U.S. PATENT DOCUMENTS

| | | | |
|---|---|---|---|
| 2002/0111737 A1* | 8/2002 | Hoisko | G01C 21/20 701/526 |
| 2004/0239986 A1* | 12/2004 | Wise | G06F 3/122 358/1.15 |
| 2006/0028454 A1* | 2/2006 | Branton et al. | 345/173 |
| 2008/0319598 A1 | 12/2008 | Sakurai et al. | 701/23 |
| 2009/0076723 A1 | 3/2009 | Moloney | 701/209 |
| 2010/0152794 A1 | 6/2010 | Radivojevic et al. | 607/2 |
| 2010/0171715 A1 | 7/2010 | Peterson et al. | |
| 2011/0037707 A1* | 2/2011 | Radivojevic et al. | 345/173 |
| 2011/0096013 A1* | 4/2011 | Krumpelman et al. | 345/173 |
| 2011/0148807 A1* | 6/2011 | Fryer | 345/174 |
| 2011/0279250 A1 | 11/2011 | Ryhanen et al. | 340/407.2 |
| 2011/0285667 A1* | 11/2011 | Poupyrev et al. | 345/174 |
| 2012/0176525 A1* | 7/2012 | Garin | G01C 21/20 348/333.02 |
| 2013/0135223 A1* | 5/2013 | Shai | 345/173 |
| 2014/0266570 A1* | 9/2014 | Sharma | G09B 21/003 340/4.12 |
| 2014/0266571 A1* | 9/2014 | Sharma | G09B 21/003 340/4.12 |
| 2014/0282105 A1* | 9/2014 | Nordstrom | H04L 65/403 715/753 |
| 2014/0297184 A1* | 10/2014 | Kato | G01C 21/00 701/538 |
| 2014/0313021 A1* | 10/2014 | Radivojevic | G01C 21/3652 340/407.1 |
| 2014/0379248 A1* | 12/2014 | Garin | G01C 21/20 701/400 |
| 2015/0153179 A1* | 6/2015 | Bolzmacher | G01C 21/3652 345/173 |
| 2016/0070348 A1* | 3/2016 | Cowley | G06F 3/016 345/156 |

FOREIGN PATENT DOCUMENTS

| | | |
|---|---|---|
| CN | 102326135 A | 1/2012 |
| EP | 2 463 628 A2 | 6/2012 |
| GB | 2489906 A1 | 10/2012 |
| JP | 2008/286547 A1 | 11/2008 |
| KR | 20100133216 A | 12/2010 |
| WO | WO 03/054782 A1 * | 3/2003 |
| WO | WO 03/054782 A1 | 7/2003 |
| WO | WO-2007/105937 A1 | 9/2007 |
| WO | 2012122438 A2 | 9/2012 |

* cited by examiner

HAPTIC DEVICE FOR PEDESTRIAN NAVIGATION

BACKGROUND

Technical Field

The exemplary and non-limiting embodiments disclosed herein relate generally to haptic devices and, more particularly, to mobile devices that incorporate haptic feedback for navigation applications.

Brief Description of Prior Developments

Tactile devices comprising actuators for producing navigation instructions are known. Some tactile devices use vibrating elements that vibrate at different intensities based on angular differences between a destination direction and a direction of orientation of a terminal. Other tactile devices use tilting and/or leaning as methods of supplying direction. In any case, such devices can be handheld or worn by the user.

SUMMARY

The following summary is merely intended to be exemplary. The summary is not intended no limit the score of the claims.

In accordance with one aspect, an apparatus comprises a first magnetic plate; a second magnetic plate oriented parallel to the first magnetic plate, magnetically coupled to the first magnetic plate, and slidable relative to the first magnetic plate; a dielectric material positioned between the first magnetic plate and the second magnetic plate; and a contact in communication with the first magnetic plate and the second magnetic place through which a voltage is applied, the voltage generating a signal that is responsive to a task performed on a mobile device, the signal providing a haptic effect so the first magnetic place and the second magnetic plate upon sliding of the first magnetic plate relative to the second magnetic place.

In accordance with another aspect, a method comprises inputting destination data into a mobile device; linking a haptic feedback device to the mobile device using a wireless connection; adjusting the haptic feedback device; determining whether a direction to the destination is correct based on haptic feedback provided from the haptic feedback device; moving in the direction to the destination; and reaching the destination.

In accordance with another aspect, a non-transitory computer readable storage medium, comprising one or more sequences of one or more instructions which, when executed by one or more processors of an apparatus, causes the apparatus to at least: link a haptic feedback device to a mobile device using a wireless connection; and provide haptic feedback from the haptic feedback device.

BRIEF DESCRIPTION OF THE DRAWINGS

The foregoing aspects and other features are explained in the following description, taken in connection with the accompanying drawings, wherein.

DETAILED DESCRIPTION OF EMBODIMENT

Figure 1A:
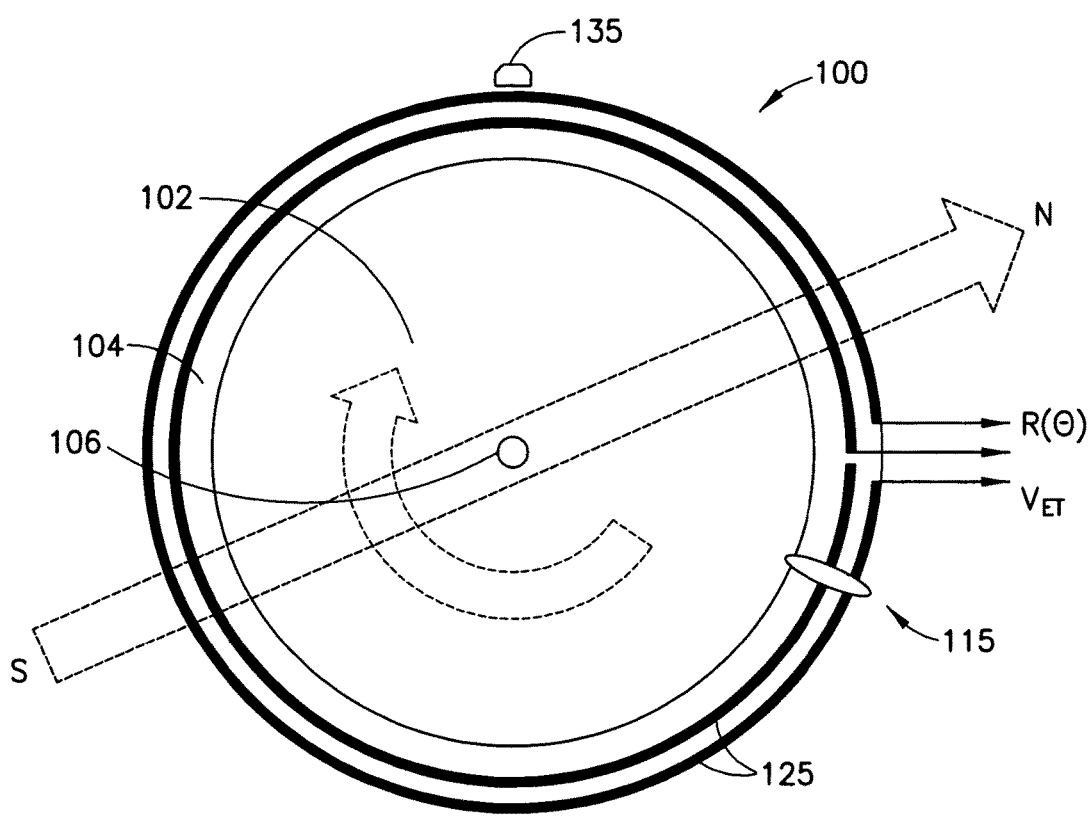
FIG. 1A is a top view of one exemplary embodiment of a haptic device comprising two magnetic wheels in a parallel orientation.

Electronic maps and location-based navigation services are becoming more ubiquitous in mobile devices. However, electronic navigation using a mobile device at present requires cognitive effort and frequent recourse to viewing of a screen device (in the absence of voice guidance, which may not always be to a user's taste, especially in a crowded urban environment, for example). It is desirable for electronic navigation mobile devices to enable communication with the user without forcing the user to be constantly immersed in viewing the screen device to the exclusion of other ongoing tasks, such as walking. Haptics (vibratory electrotactile feedback) offers the possibility of a solution whereby enough information is conveyed to the user such that the information can also be mentally processed without detracting from other tasks at hand. It is also desirable for tactile information to be conveyed using a device that is easily handled in a blind-use scenario.

The exemplary devices disclosed herein are haptic devices that generally comprise sliding and/or rotating mechanisms that obviate or at least reduce the need for buttons. The emphasis is on low cost implementations of devices that are companion to mobile devices (e.g., in a master/slave relationship) and that utilize ET feedback, allowing for non-visual interaction of the companion device with the mobile device through wireless technologies (e.g., by utilizing a Bluetooth® Low Energy or an ANT+™ wireless connection) to access the extended capabilities of a mobile device, thereby augmenting a user's interaction with the mobile device. The ET technology offers ultra-low power consumption for programmable haptic technology relative co other electromechanical actuator technologies.

The exemplary devices are ET-keyrings that are linked to the mobile devices (e.g., smart phones or mobile displays or terminals) based on ET-keyring (ET-keyring/ETK) technology. The devices disclosed herein are not limited to being keyrings, however, as any other similar configuration may be considered. One exemplary use of an ET-keyring is for haptic navigation (e.g., pedestrian, bicycle, and the like) that allows for street level guidance as well as line-of-sight guidance. Other exemplary uses include haptic control of data devices (audio and video), as well as haptic applications with regard to entertainment (e.g., toys), therapeutic devices, and the like.

Mobile devices have navigational functionality through global positioning satellite (GPS) systems. However, viewing maps on mobile displays while moving is frequently not the most suitable interaction scenario when the user wants to get to a particular place (especially in a crowded environment). In the exemplary devices as disclosed herein, the user preselects a target location and route on a mobile terminal, following which the actual guidance is performed by tactile perceptions via the companion device, e.g., the ET-keyring. The mobile device streams information about the navigation through a wireless channel and gives instructions to the ET-keyring as to the correct direction to move in. The user sets the target location on the mobile terminal and then follows the guidance by sliding and/or rotating the ET-keyring using their fingers and checking/confirming the right direction to move in and/or how far the target location is. In the exemplary embodiments disclosed herein, the ET-keyring is a simplified tactile-tile-slider system that enables movement of two surfaces in intimate contact with programmability of texture perceptions via tactile feedback to the user. The GPS system of one mobile device is not discussed here; however, the ET-keyring will work with any mobile terminal which is linked via a wireless connection.

The ET-keyring device has a "low cognitive effort" requirement and presents an "easy-to-operate" approach to complex navigational tasks. Besides indicating the right direction to travel in, the ET-keyring has the added functionality of delivering "distance-to-target" information to the user. For instance, the intensity of the texture signals can be changed in accordance with the distance-to-target (more intense means closer to the target location). Furthermore, the ET-keyring allows for subtle navigating in crowded areas without having to observe maps or electronic navigation devices, thus making the user appear less like a tourist and allowing him to focus on his surroundings. In addition, the ET-keyring can also be used as a therapeutic device where the user relaxes/exercises his fingers while listening to music on the mobile device and perceiving the music-driven rhythm as a texture on the ET-keyring.

In any embodiment, deviation from the prescribed path could be indicated by a chance in frequency, a change in amplitude, or the introduction of noisy ET signals, or the like.

Referring to the Figures, one exemplary embodiment, of one ST-key ring is shown. Although the features of the ET-keyring for navigation purposes will be described with reference to the example embodiments shown in the drawings, it should be understood chat features can be embodied in many alternate forms. In addition, any suitable size, shape, or type of elements or materials could be used.

Figure 1B:
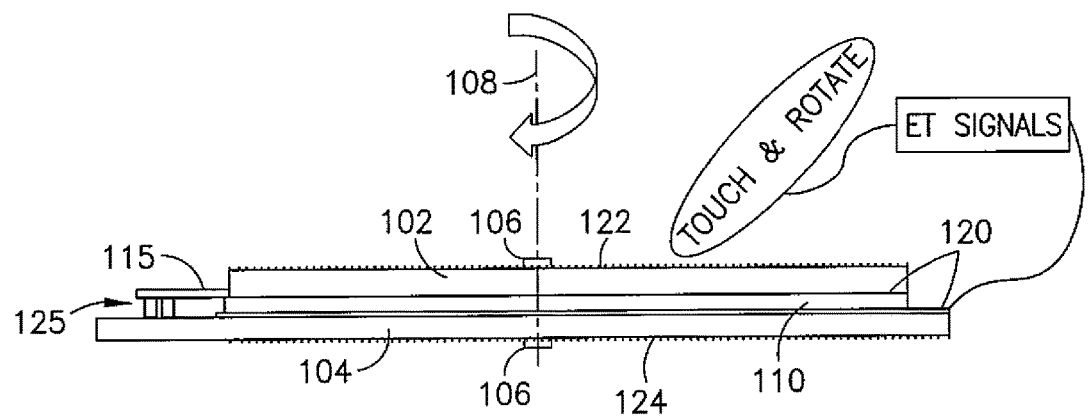
FIG. 1B is a cross-sectional view of the haptic device of FIG. 1A.

Referring now to FIGS. 1A and 1B, the ET-keyring is designated generally at 100 and is hereinafter referred to as "ET-keyring 100." ET-keyring 100 comprises two magnetized surfaces (wheels) orientated in parallel and configured to be able to slide and/or rotate over each other. The two sliding/rotating magnetized surfaces comprise a first substrate or first plane 102 magnetically coupled to a second substrate or second plate 104 via one or more central magnets 106 that allow the first plate 102 to be rotatable relative to the second plate 104 about an axis 108. The first plate 102 and the second plate 104 each comprise a polymer or glass sheet, each plate 102, 111 being substantially unaffected by humid conditions or moisture on the interfacing surfaces of one plates 102, 104.

Each place 102, 104 is rendered magnetic via a respective magnetic film 122, 124 disposed on opposing faces of each plate 102, 104. The magnetic films 122, 124 each comprise dispersed magnetic dots, optically transparent magnetic film, or the like. The two plates 102, 104 are kept together by a magnetic field which is implemented via the magnetic films 122, 124.

A thin film of dielectric material 110 is located between the plates 102, 104. The dielectric material 110 may be a lubricant that facilitates the sliding contact of the first plate 102 relative to the second plate 104. The surfaces of the plates 102, 104 facing the dielectric material 110 are each covered with a thin film of conductive material 120 such as indium tin oxide, graphene, graphene oxide, combinations of the foregoing materials, or the like. The conductive material 120 provides conducting layers (in sliding contact through the dielectric material 110) that together define a large-area capacitor.

As shown in FIG. 1A, in some exemplary embodiments an alignment marker 135 may be disposed on an edge of the second plate 104 that, when synced up with the mobile device, indicates a "forward" direction to the user.

Alternating signals on the conducting plates produce palpable haptic effects, which can then become the basis for means for interacting with a mobile device. In one exemplary embodiment, to provide the alternating signals, a contact 115 is coupled to an edge of the first plate 102, the contact 125 being in sliding communication with two resistor traces 125 extending around the edge of the second plate 102.

The act of sliding the first plate 102 over the second plate 104 while a voltage is applied to the two plates 102, 104 through the contact 115 triggers a signal via electrotactile feedback drive circuitry (ET-circuitry). The signal is responsive to a task being performed on the mobile device (e.g., navigation). As the first plate 102 is rotated relative to the second plate 101, the position of the contact 115 is varied along the resistor traces 125, thereby changing the voltage and resistance values and providing for an ET feedback chat indicates the user is on (or off) the calculated path.

Figure 1C:
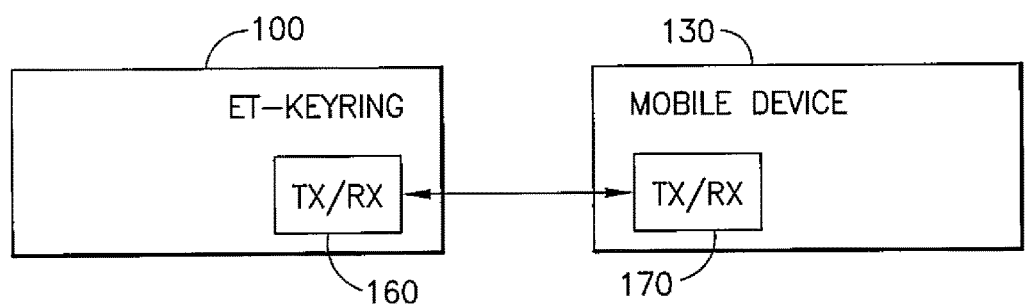
FIG. 1C is a schematic representation of the haptic device of FIGS. 1A and 1B linked to a mobile device.

Referring now to FIG. 1C, the ET-circuitry can be built into a casing of the ET-keyring 100. In one exemplary embodiment, the ET keyring 100 may be linked to the mobile device, which is shown at 130, via a transmitter/receiver device 160 in the casing of the ET keyring 100 that communicates with a transmitter/receiver device 170 in the mobile device 130. The operation of ET-circuitry of the transmitter/receiver devices 160, 170 is triggered by the user (the ET-circuitry may be not activated or in a "sleep" mode at other times), and the signals are determined by the user's interaction with the mobile device 130 (or other navigation tool) even though the user is not viewing or interacting directly with the mobile device, electronic map, etc. Tactile signals are mostly predicated on guiding the user by providing a tactile response that indicates the direction the user needs to take.

Figure 2A:
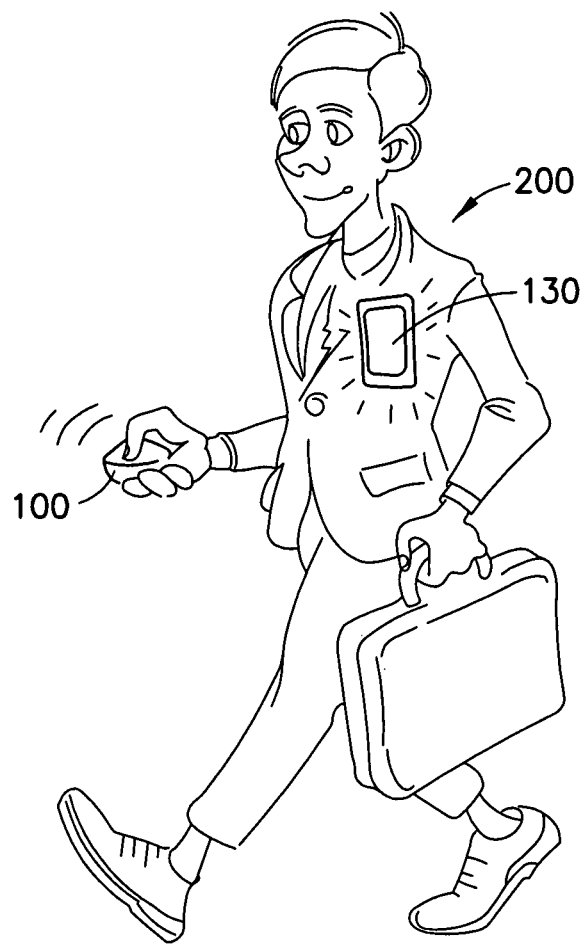
FIG. 2A is schematic representation of a user using the haptic device of FIGS. 1A and 1B.
Figure 2B:
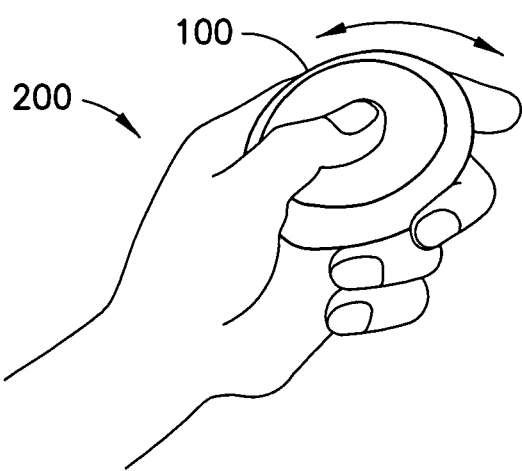
FIG. 2B is a schematic representation of a hand of the user of FIG. 2A rotating/sliding the wheels of the haptic device.

Referring now to FIGS. 2A and 2B, the mobile device 130 may be kept in a pocket in a fixed orientation relative to the body of the user, shown at 200 (e.g., in a horizontal/vertical position). According to the orientation and positron of the user 200 (and therefore the position of the mobile device 130), the ET-keyring 100 receives information pertaining to the preferred direction. With this information, the ET-keyring 100 creates a tactile pattern which is then perceived by the user 200 when sliding/rotating the ET-keyring places over each otter. For example, when the user 200 is facing the correct direction in which to go, the ET-keyring 100 (when rotated by the fingers of the user 200) delivers a more intense tactile pattern to the user 200 (to distinguish it from the wrong direction, which will have a less intense signal, perhaps also with a different texture pattern, the difference being readily perceived by the user 200). In this way the user 200 does not need to look at a complicated map on the mobile device 130 to obtain guidance on pedestrian paths to determine the direction in which to proceed (turn left/right or go ahead). The user 200 can simply hold the ET-keyring 100 in hand (or even in a pocket) and check (occasionally) if he/she has kept on the right path/direction.

In another exemplary embodiment, the fixed alignment mark 135 allows the ET-keyring 100 to be easily aligned by the user 200 with the same orientation as the mobile device 130. This allows the feedback to be given at a particular angular position of the first plate 102 relative to the alignment mark 135, so that a bump, series of bumps, or a texture is felt, for example at the 90 degree position of the first plate 102 relative to the second plate 104 when a right turn is to be made or at the 270 degree position when a left turn is to be made. This embodiment has the added advantage that the user 200 does not need to turn his body (and mobile device 130) while continually using the ET-keyring 100 to establish whether he is facing in the correct direction.

Figure 3:
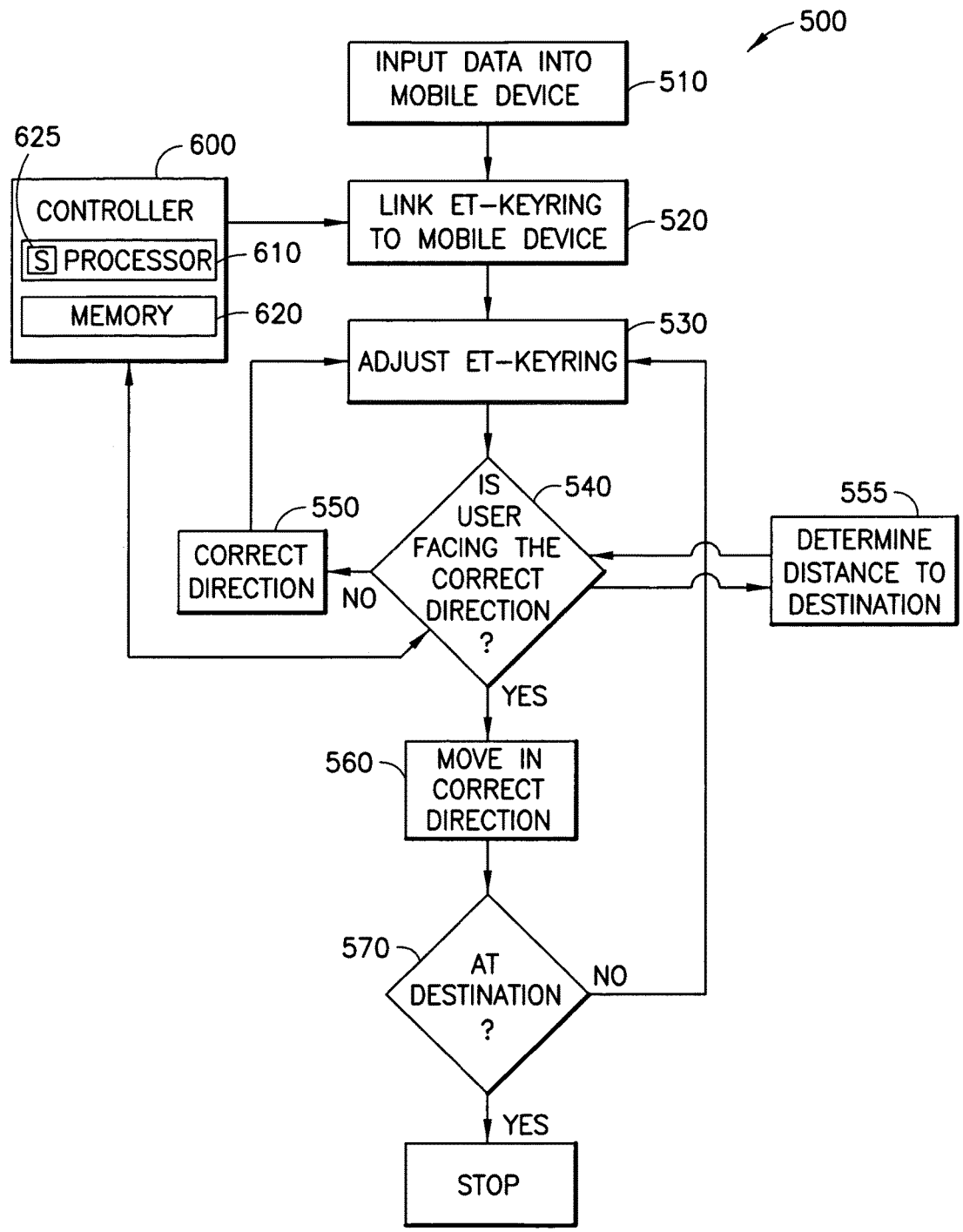
FIG. 3 is a flowchart illustrating one exemplary embodiment of a method of navigating using the haptic device.

Referring now to FIG. 3, a method of navigating using the ET-keyring 100 is designated generally by the reference number 500 and hereinafter referred to as "method 500." In method 500, data is input into a mobile device in an input step 510. The input step 510 may comprise entering a destination by street address or other information indicative of the destination. After the input step 510, the ET-keyring 100 is linked to the mobile device in a linking step 520 (e.g., by selecting a suitable wireless connectivity parameter on the mobile device that initiates a connection to the ET-circuitry of the ET-keyring 100). The linking step 520 may be carried out using a controller 600 having a processor 610 and a memory 620. The processor 610 may include software 625.

The user 200 then begins navigating to the destination. In doing so, the user adjusts the ET-keyring 100 by sliding or rotating the first plate 102 relative to the second plate 101 in an adjustment step 530. A determination is then made in a determining step 540 as to whether the user 200 is facing in the correct direction based on tactic feedback provided by the controller 600 and received (or not received) through the ET-keyring 100. In the exemplary embodiment shown, if the user does not receive haptic feedback through the ET-keyring 100, the user 200 is not facing in the correct direction and so corrects his direction in a correcting step 550 after which he adjusts the ET-keyring 100 in the adjustment step 530 again. If (or once) the user receives haptic feedback in the determining step 540, the user 200 moves in the correct direction in a moving step 560. Upon receiving haptic feedback in the determining step 540, the user 200 may also determine a distance to the destination in a distance determination step 555.

Periodically, the user assesses whether he is at the destination in a destination determining step 570. In the destination determining step 570, if the user 200 determines that he is not at the destination, then he returns to the adjustment step 530 and adjusts the ET-keyring 100 and proceeds to the determining step 540, possibly proceeding back through the correcting step 550, and proceeding again through the moving step 560 back to the destination determining step 570. Once it is determined in the determining step 540 that the user 200 has reached the destination, the user 200 stops.

Tactile signals can also be employed in other ways, such as indicating the range of the user from the intended destination (e.g., distance determination step 555). A distance-squared relationship tactile response could be employed in this scenario, where the tactile signals increase in frequency (frequency of pulse train signals) as the user gets closer to the intended target. In practice, besides gaining tactile information about the preferred direction in which to go, the user can be easily informed how far away the target is just by adapting the frequency of pulse-train signals of the tactile perception.

Figure 4A:
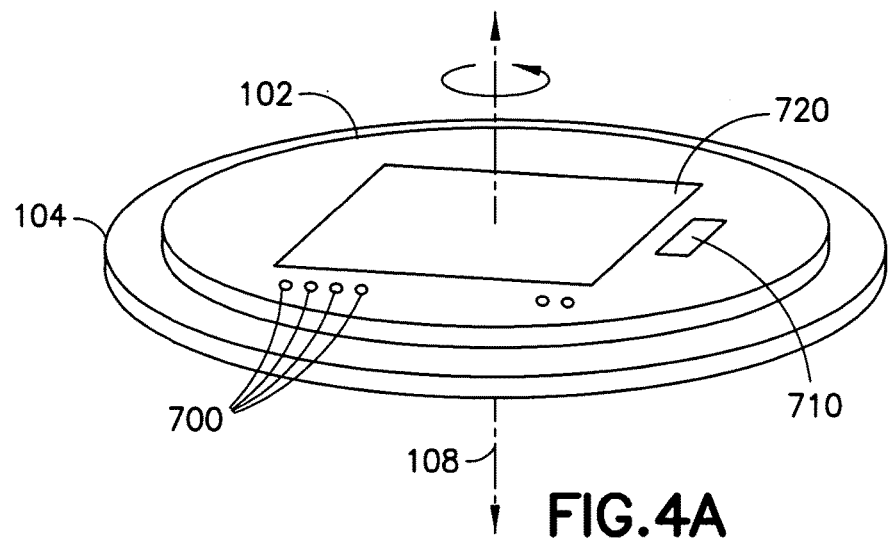
FIG. 4A is a perspective view of one exemplary embodiment of a haptic device incorporating various ancillary features.

Referring now to FIG. 4A, one exemplary embodiment of the ET-keyring 100 is shown in which the ET-keyring is adapted for other uses, such as for entertainment. In such embodiments, devices by which various signals may be employed with the ET-keyring 100 are incorporated. For example, the ET-keyring 100 may include LEDs 700 (or other visual signaling devices), speakers 710 (or other audio devices), a simple touch screen 700, or the like. In adapting one concepts of the ET-keyring 100 to embody a toy or similar device (e.g., a virtual pet), audio or visual signals may be incorporated to alert the user to the need for engaging with the toy in a tactile sense.

The ET-keyring 100 also includes means for the device to communicate with other, more sophisticated devices, e.g., mobile phones, e-maps, e-readers, and the like. Such means of communication is mainly envisioned to be wireless and carried out through the transmitter/receiver devices 160, 170.

Figure 4B:
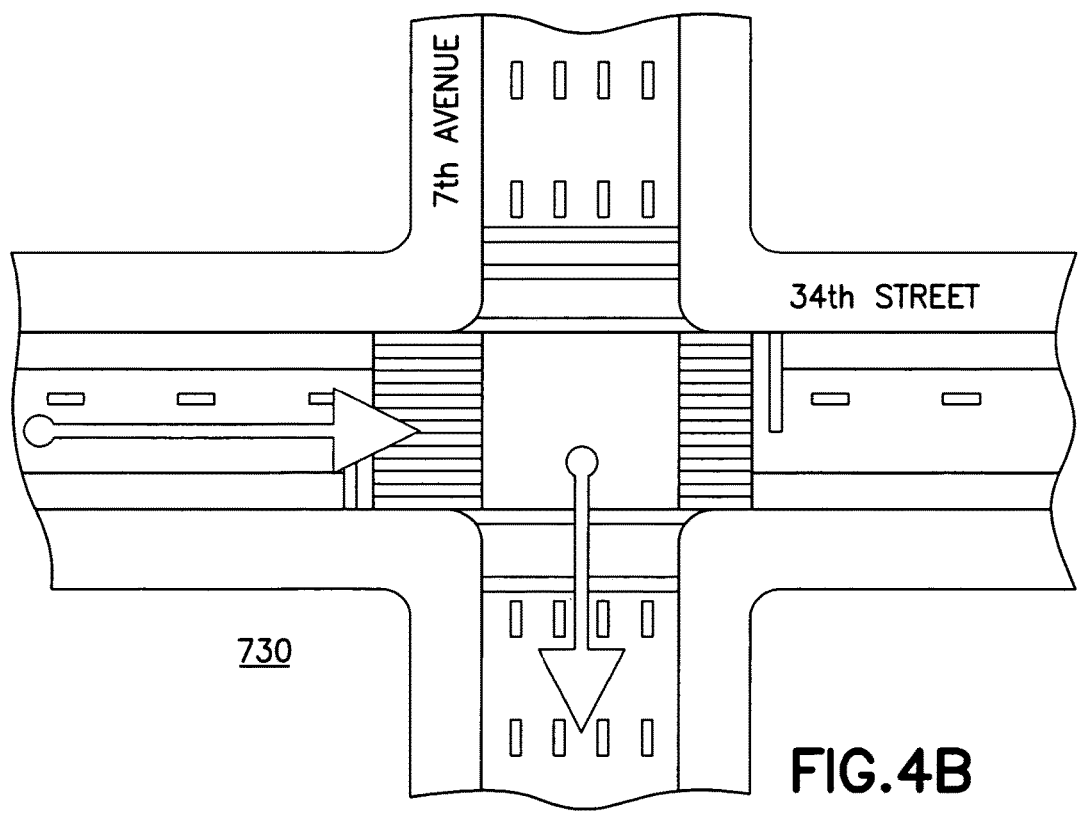
FIG. 4B is a representation of one exemplary embodiment of a screen of a haptic device.

The utility of the ET-keyring 100 may yet be expanded further without compromising the companion aspect of the device, for example, the compatibility of the companion device with the mobile device 130. Embodiments of the ET-keyring 100 including the touch screen 720 (which may incorporate a means for identifying finger location) can employ electrophoretic ink to carry out and enhance the tactile interaction, especially when the touch screen 720 is used in conjunction with entertainment applications or navigation applications in which the user 202 interacts with the mobile device 130 through the touch screen 720. In any case, the materials for the plates 102, 104 should be chosen accordingly. An optically transparent version of the ET-keyring 100 is envisioned, which could enable on-display applications and a direct correlation of tactile perceptions with visual images seen on the touch screen 720. For example, as shown in FIG. 4B, in some exemplary embodiments the ET-keyring 100 may incorporate a touch screen 720 that displays a representation of a map 720 as a static haptic image (e.g., about 10×20 pixels) in order to replicate a map displayed on the mobile device 130. This would offer, in addition to the navigation concept described, mapping of a user's immediate environment. An ET-keyring 100 incorporating such a touch screen 720 may be made operable by means of finger guidance, in which the desired path could be associated with a particular frequency, or in which the desired path could be associated with no ET signal at all.

Referring back to FIG. 4A, the ET-keyring 100 can also be used as a remote, haptic scroll wheel when the first plate 102 is rotated relative to the second plate 104 about the axis 108, allowing for the browsing of a list of files (e.g., videos or songs) on the mobile device 130 and/or the touch screen 720 and subsequent selection of a file, for example, by pressing the touch screen 720. Also, the ET-keyring 100 can be used to control the volume of a music player without the need to remove the mobile device from a pocket.

The virtues of this invention with regard to navigation pertain to the use of haptic technology so as to avoid or minimize visual reference to a navigation device by, for example, maneuvering a rotatable/slidable wheel arrangement to receive tactile cues pertaining to the correct direction to take. For this purpose, a navigation or orientation mark on the casing of the device could be used, for example, to indicate north, which would obviate the weed for a gyroscope. It could also easily be employed to provide Information to the user about the range to one intended target/destination by causing the frequency of tactile feedback to vary based on distance.

The ET-keyring 100 can also act as a stand-alone device when used in an entertainment or therapeutic mode. In this embodiment, the device is intended to transmit continual random textures while in use. The textures can abruptly change to a distinct regular signal to alert the user of an incoming SMS/email/telephone call, etc. This would involve only very small cognitive effort for the user. The connection may be infrequent, and controlled by the user as they see fit, to reduce the power consumption.

Furthermore, with regard to entertainment, virtual pet devices and other types of toys (which may be considered to be anti-stress) generally offer only audio and visual interaction with their "owners." Adding a tactile component to a virtual pet device offers a chance for a much more authentic virtual pet experience. Also, random or programmed tactile effects can be produced to replicate, for example, tire texture of a real animal or certain actions associated with an animal (e.g., purring, oinking, hissing, and the like).

Tactile feedback may also have applications in video gaming. Modern video gaming entails increasingly newer paradigms of interaction between the user and the gaming console (or accessories to the gaming console). Introducing tactile patterns to gameplay could offer an enhanced user experience, especially those involving an avatar moving within a virtual gamespace or a driving game, etc.

Further applications may exist with regard to the tactile examination of digital images on a display (e.g., the display of a mobile phone, computer, tablet, or the like) when touched by one finger and examined by another hand. More particularly, a user can obtain "remote texture delivery" by touching one image seen on a display using a finger of his left hand and receiving textural information pertaining to the touched object by moving a device of an ET system with his right hand. This may be beneficial to Internet-based purchasing and auctioning services where buyers could touch and feel objects on sale prior to clicking a device or pressing a button to make a purchase.

In one exemplary embodiment, an apparatus comprises a first magnetic plate; a second magnetic plate oriented parallel to the first magnetic plate, magnetically coupled to the first magnetic plate, and slidable relative to the first magnetic plate; a dielectric material positioned between the first magnetic plate and the second magnetic plate; and a contact in communication with the first magnetic plate and the second magnetic plate through which a voltage is applied, tune collage generating a signal that is responsive co a task performed on a mobile device, the signal providing a haptic effect to the first magnetic plate and the second magnetic plate upon sliding of the first magnetic plate relative to the second magnetic plate.

The first magnetic plate and the second magnetic plate may each comprise magnetic films disposed on polymer or glass sheets, the magnetic films being disposed on opposing faces of each respective plate. Each magnetic film may comprise dispersed magnetic dots or optically transparent magnetic films. The first magnetic plate and the second magnetic plate may each comprise a film of conductive material, the films of conductive material being disposed on surfaces of each respective plate than face the dielectric material. The films of conductive material may each comprise indium tin oxide, graphene, graphene oxide, or combinations of the foregoing materials. Two resistor traces may extend around the edge of the second plate through which the contact maintains communication between the first magnetic plate and the second magnetic plate. The apparatus may further comprise means for the apparatus to communicate wirelessly with the mobile device. The apparatus may be embodied in a keyring.

In another exemplary embodiment, a method comprises inputting destination data into a mobile device; linking a haptic feedback device to the mobile device using a wireless connection; adjusting the haptic feedback device; determining whether a direction to the destination is correct based on haptic feedback provided from the haptic feedback device; moving in the direction to the destination; and reaching the destination.

Linking a haptic feedback device to the mobile device may comprise selecting a wireless connectivity parameter on the mobile device to initiate a connection to circuitry of the haptic feedback device. The method may further comprise correcting the direction to the destination based on the haptic feedback from the haptic feedback device. The method may further comprise re-adjusting the haptic feedback device and correcting the direction to the destination. The method may still further comprise determining a distance to the destination in a distance determination step. Adjusting the haptic feedback device may comprise sliding a first plate relative to a second plate to produce a voltage. Sliding the first plate relative to the second plate to produce a voltage may produce the haptic feedback.

In another exemplary aspect, a non-transitory computer readable storage medium, comprising one or more sequences of one or more instructions which, when executed by one or more processors of an apparatus, causes the apparatus to at least: link a haptic feedback device to a mobile device using a wireless connection; and provide haptic feedback from the haptic feedback device.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A haptic feedback device, comprising:
   at least one processor; and
   at least one non-transitory memory including computer program code, the at least one memory and the computer program code configured to, with the at least one processor, cause the apparatus at least to perform:
   linking the haptic feedback device to a mobile device using a wireless connection;
   providing haptic feedback from the haptic feedback device; and
   determining, when a user manually adjusts the haptic feedback device, whether a direction to the destination is correct based on the haptic feedback provided from the haptic feedback device;
   wherein the haptic feedback device is a handheld electrotactile device comprising a tactile-tile-slider system comprising one or more programmable texture perceptions, and wherein the handheld electrotactile device is configured to be carried by the user;
   wherein the haptic feedback is a vibratory electrotactile feedback; and
   wherein the user does not receive the haptic feedback when the user is not facing the correct direction, and wherein the user receives the haptic feedback when the user is facing the correct direction.

2. The haptic feedback device of claim 1, wherein the tactile-tile-slider system comprises:
a first magnetic plate;
a second magnetic plate oriented parallel to the first magnetic plate, magnetically coupled to the first magnetic plate, and slidable relative to the first magnetic plate;
a dielectric material positioned between the first magnetic plate and the second magnetic plate; and
a contact in communication with the first magnetic plate and the second magnetic plate through which a voltage is applied, the voltage generating a signal that provides the haptic feedback, wherein manually adjusting the haptic feedback device comprises sliding of the first magnetic plate relative to the second magnetic plate.

3. The haptic feedback device of claim 2, wherein the first magnetic plate and the second magnetic plate each comprise magnetic films disposed on polymer or glass sheets, the magnetic films being disposed on opposing faces of each respective plate.

4. The haptic feedback device of claim 3, wherein the magnetic films each comprise dispersed magnetic dots or optically transparent magnetic films.

5. The haptic feedback device of claim 2, wherein the first magnetic plate and the second magnetic plate each comprise a film of conductive material, the films of conductive material being disposed on surfaces of each respective plate that face the dielectric material.

6. The haptic feedback device of claim 5, wherein the films of conductive material each comprise indium tin oxide, graphene, graphene oxide, or combinations of the foregoing materials.

7. The haptic feedback device of claim 2, wherein the tactile-tile-slider further comprises two resistor traces extending around the edge of the second plate through which the contact maintains communication between the first magnetic plate and the second magnetic plate.

8. The haptic feedback device of claim 2, wherein the the haptic feedback device is embodied in a keyring.

9. A method, comprising,
inputting destination data into a mobile device;
linking a haptic feedback device to the mobile device using a wireless connection;
adjusting the haptic feedback device via a manual adjustment by a user;
determining, when the user adjusts the haptic feedback, whether a direction to the destination is correct based on haptic feedback provided from the haptic feedback device;
moving in the direction to the destination; and
reaching the destination;
wherein the haptic feedback device is a handheld electrotactile device comprising a tactile-tile-slider system comprising one or more programmable texture perceptions, and wherein the handheld electrotactile device is configured to be carried by the user; and
wherein the haptic feedback is a vibratory electrotactile feedback; and
wherein the user does not receive the haptic feedback when the user is not facing the correct direction, and wherein the user receives the haptic feedback when the user is facing the correct direction.

10. The method of claim 9, wherein linking a haptic feedback device to the mobile device comprises selecting a wireless connectivity parameter on the mobile device to initiate a connection to circuitry of the haptic feedback device.

11. The method of claim 9, further comprising correcting the direction to the destination based on the haptic feedback from the haptic feedback device.

12. The method of claim 9, further comprising re-adjusting the haptic feedback device and correcting the direction to the destination.

13. The method of claim 9, further comprising determining a distance to the destination in a distance determination step.

14. The method of claim 9, wherein adjusting the haptic feedback device comprises sliding a first plate relative to a second plate to produce a voltage.

15. The method of claim 14, wherein sliding the first plate relative to the second plate to produce a voltage produces the haptic feedback.

16. A non-transitory computer readable storage medium, comprising one or more sequences of one or more instructions which, when executed by one or more processors of an apparatus, causes the apparatus to at least:
link a haptic feedback device to a mobile device using a wireless connection;
provide haptic feedback from the haptic feedback device; and
determine, when a user manually adjusts the haptic feedback device, whether a direction to the destination is correct based on the haptic feedback provided from the haptic feedback device;
wherein the haptic feedback device is a handheld electrotactile device comprising a tactile-tile-slider system comprising one or more programmable texture perceptions, and wherein the handheld electrotactile device is configured to be carried by the user;
wherein the haptic feedback comprises a haptic effect as a vibratory electrotactile feedback; and
wherein the user does not receive the haptic feedback when the user is not facing the correct direction, and wherein the user receives the haptic feedback when the user is facing the correct direction.

\* \* \* \* \*